United States Patent Office

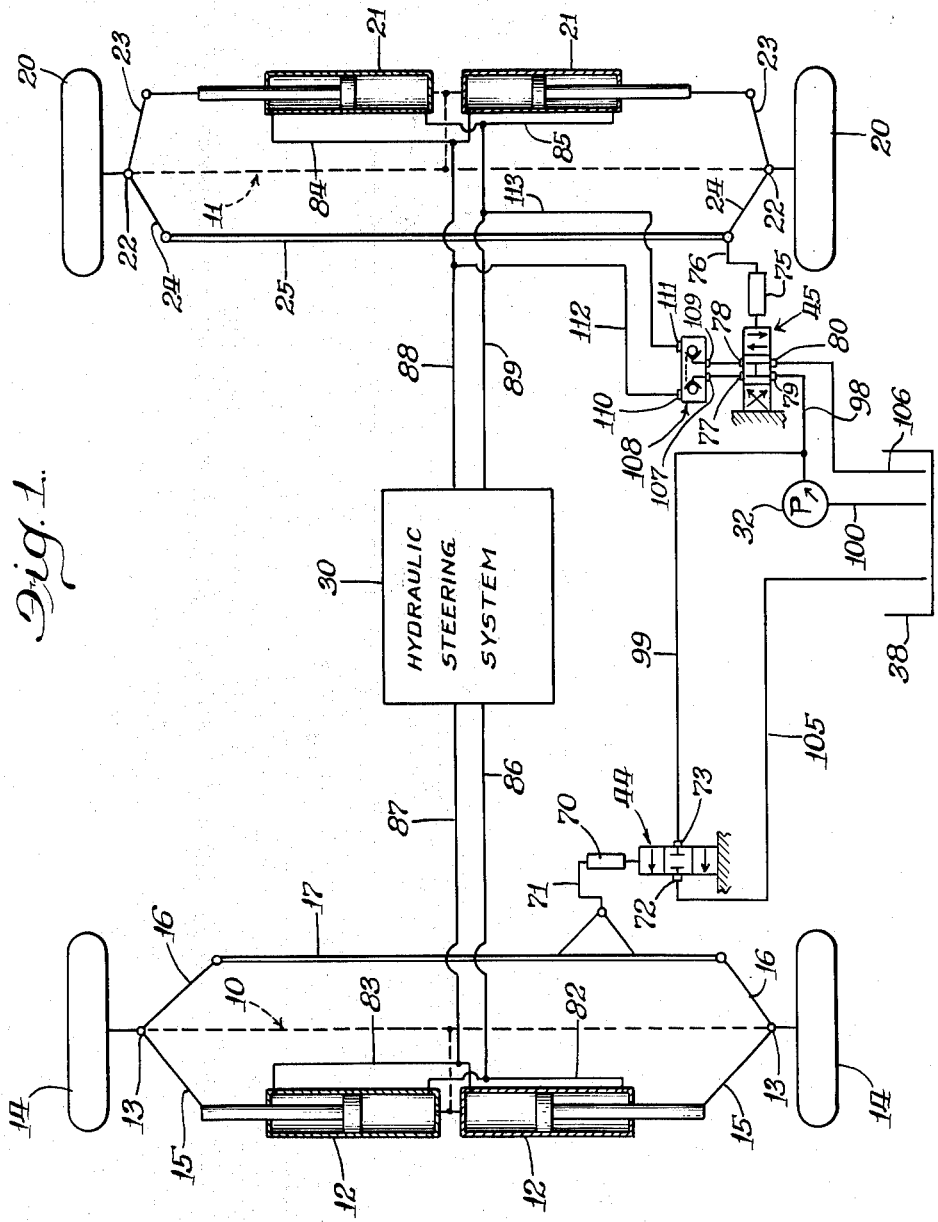

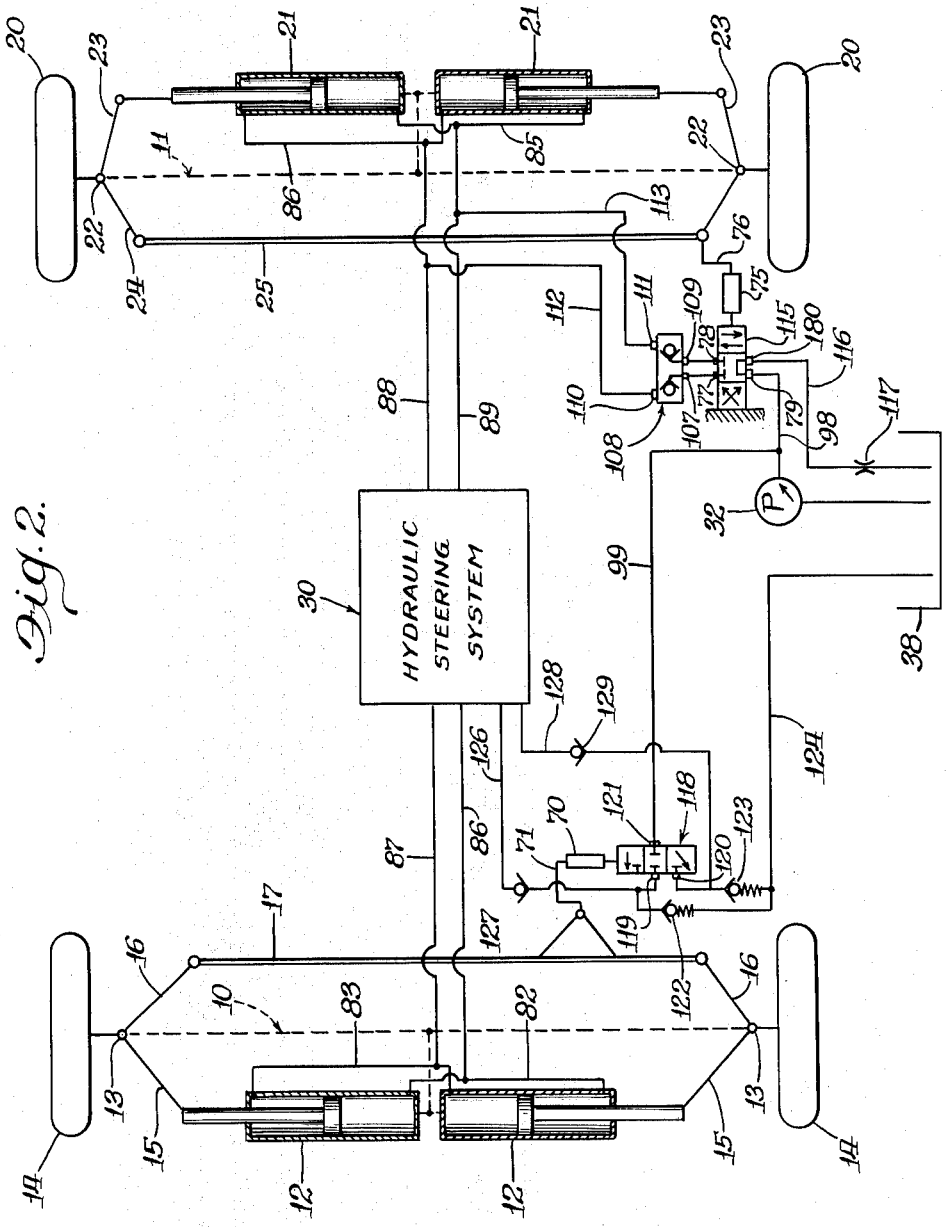

3,227,238
Patented Jan. 4, 1966

3,227,238
HYDRAULIC STEERING SYSTEMS
Don S. Strader, Mount Prospect, Ill., assignor to The
Frank G. Hough Co., a corporation of Illinois
Original application Sept. 14, 1961, Ser. No. 138,107.
Divided and this application Apr. 30, 1963, Ser. No.
276,729
16 Claims. (Cl. 180—79.2)

This is a division of applicant's copending application Serial No. 138,107, filed September 14, 1961.

This invention relates generally to motor vehicle hydraulic steering systems, and more particularly to a novel arrangement for aligning the wheels of a motor vehicle which are steered by a hydraulic steering system.

The primary object of the present invention is to provide a novel arrangement for centering or aligning the wheels of a hydraulically-steered motor vehicle.

It is a further object to provide a novel arrangement for positioning the rear wheels of a motor vehicle in alignment with the front wheels thereof without the use of indicators in the operator's compartment and without the necessity for any manual correction of the alignment position of the rear wheels.

It is still another object to provide novel means for a hydraulically-steered motor vehicle providing automatic return of the forward and rearward wheels of the vehicle to the straight-ahead driving position whenever steering effort is released from the steering wheel.

Other objects and features of the invention will be apparent upon a perusal of the following specification and drawings, in which:

FIGURE 1 is a diagrammatic view of a motor vehicle constructed according to the invention; and FIGURE 2 is a diagrammatic view similar to FIGURE 1 but further showing the novel automatic means of the invention for returning the wheels of the vehicle to the straight-ahead position when steering effort is released from the steering wheel.

The present embodiments are the preferred embodiments, but it is to be understood that changes can be made in the present embodiments by one skilled in the art without departing from the spirit and scope of the present invention.

Generally, the first embodiment of the invention provides a novel arrangement for automatically aligning the steerable rearward wheels of a motor vehicle in the straight-ahead driving position whenever the forward wheels of the vehicle are aligned in the straight-ahead driving position. The arrangement comprises a first valve, the operation of which is controlled by the steered position of the forward wheels, a second valve the operation of which is controlled by the steered position of the rearward wheels, a locking valve, and an engine driven hydraulic fluid pump. The pump is continuously driven by the engine of the motor vehicle and is connected to the rear wheel operated valve. The rear wheel-operated valve is in turn connected to the locking valve, and the locking valve in turn is connected to the hydraulic fluid cylinders which are provided for steering the rearward wheels of the vehicle. The locking valve prevents the rear wheel centering system from interfering with normal steering of the rearward wheels. The pressure side of the pump is connected to the valve which is operated by the forward wheels of the vehicle. The forward wheel-operated valve is so constructed that when the forward wheels are in any position other than the straight-ahead driving position, the pressure side of the pump is vented. When the forward wheels are in the straight-ahead driving position, the forward wheel-operated valve permits the pump to develop hydraulic fluid pressure. If at that time the rearward wheels of the vehicle are in some position other than the straight-ahead driving position, the hydraulic fluid under pressure from the pump is directed through the rear wheel-operated valve and the locking valve to the steering cylinders for the rearward wheels to operate those steering cylinders to turn the rearward wheels toward the straight-ahead driving position. When that position is attained, the rear wheel-operated valve is moved to a center position cutting off the hydraulic fluid flow from the pump. The output of the pump is then directed to the reservoir.

In the second embodiment of the invention the forward and rearward wheel-operated valves are modified and a certain number of check valves are provided. The second embodiment of the invention provides automatic return of the wheels of the vehicle to the straight-ahead driving position whenever, after some steering effort, the steering wheel is released. Two of the check valves which are connected to the forward wheel-operated valve prevent any interference of the automatic wheel straightening elements with the hydraulic steering system for steering the wheels of the vehicle. The automatic return feature of the second embodiment is intended to be used with a hydraulic steering system having hydraulic steering valves which are self-restoring and which are operated only when some steering control fluid pressures are applied thereto. After the wheels have been steered and the control pressures no longer developed, the forward wheel-operated valve will direct fluid from the engine driven pump to the hydraulic steering system to energize the vehicle hydraulic steering system with appropriate fluid control pressures to cause an operation of the hydraulic steering system to return the forward wheels of the vehicle to the straight-ahead driving position. The forward wheel-operated valve also controls the rearward wheels centering system to cause the rearward wheels to be aligned in the straight-ahead driving position.

In detail, the portion of the motor vehicle shown diagrammatically in FIGURE 1 comprises a forward axle 10 and a rearward axle 11. The forward axle 10 carries a pair of hydraulic rams or cylinders 12 and the kingpin assemblies 13 for the forward wheels 14. Any suitable type of axle construction known in the art may be used. The cylinder portions of the hydraulic rams 12 are pivotally connected to the axle 10, and the piston rods of the rams 12 are connected to the steering arms 15 for steering the forward wheels 14. As in conventional axle constructions, arms 16 secured to the forward wheels 14 to turn therewith are interconnected at their outer ends by a rigid link or tie rod 17.

The rearward wheels 20 are steeringly carried on the rear axle 11. The rear axle 11 carried the cylinder portions of the rear axle steering rams 21 and the kingpin assemblies 22. The kingpin assemblies 22 carry the rear wheels 20 for steering movement. The rod ends of the hydraulic rams 21 are pivotally connected to the steering arms 23 for the rear wheels 20. The rearward wheels 20 also carry arms 24, the outer ends of which are interconnected by a rigid link or tie rod 25.

The main hydraulic steering system indicated generally at 30 may be constructed according to the disclosure of the application of which the subject invention is a division, or in the manner of any other suitable hydraulic steering system known in the art. The hydraulic steering system 30 is connected to four hydraulic fluid conduits, 86, 87, 88, and 89. Conduit 86 is connected into a fluid conduit 82. Conduit 82 extends between the rod end of the cylinder of the hydraulic ram 12 connected to the left forward wheel 14 of the vehicle and the head end of the cylinder of the hydraulic ram 12 connected to the right forward wheel 14 of the vehicle. Conduit 87 is connected into a conduit 83. One end of the conduit 83 is connected to the head end of the cylinder of the hydraulic ram 12 connected to the left forward wheel 14, and the other end of conduit 83 is connected into the rod end of the cylinder of the hydraulic ram 12 connected to the right forward wheel 14 of the vehicle. Thus it may be seen that when hydraulic fluid under pressure is delivered to conduit 86 and conduit 87 is vented, the forward wheels 14 of the vehicle will be steered to the right, and the application of hydraulic fluid under pressure to conduit 87 with conduit 86 vented will produce a steering or turning of the forward wheels 14 to left. Conduit 88 is connected into a conduit 84. One end of the conduit 84 is connected into the rod end of the cylinder of the hydraulic ram 21 connected to the right rearward wheel 20 of the vehicle, and the other end of the conduit 84 is connected into the head end of the cylinder of the hydraulic ram 21 connected to the left rearward wheel 20. The conduit 89 is connected into a conduit 85. One end of the conduit 85 is connected into the head end of the cylinder of the hydraulic ram 21 connected to the right rearward wheel 20, and the other end of the conduit 85 is connected into the rod end of the cylinder of the hydraulic ram 21 connected to the left rearward wheel 20. Thus it may be seen that when hydraulic fluid under pressure is delivered to conduit 88 and conduit 89 is vented, the rearward wheels 20 will be turned to the right, and when hydraulic fluid under pressure is delivered to conduit 89 with conduit 88 vented, the rearward wheels 20 will be turned to the left.

It is contemplated that the hydraulic steering system 30 be operable in response to turning effort on some type of wheel to selectively apply hydraulic fluid under pressure and a vent to the conduits 86 or 87, with the conduits 88 and 89 being blocked. Such an arrangement provides forward wheel steering only. It is further contemplated that hydraulic fluid under pressure and a vent may be selectively contemporaneously applied to the conduits 88 and 89 so that the rearward wheels 20 may be steered at the same time that the forward wheels 14 are steered, and either in the same direction as the forward wheels are steered or in the opposite direction that the forward wheels are steered. It is further contemplated that the hydraulic steering system 30 be such that when no steering effort is being applied, all of the conduits 86, 87, 88, and 89 are blocked to maintain the steering positions attained.

The novel rearward wheel alignment system of the first embodiment of the invention comprises a hydraulic fluid pump 32, a control valve 44, a control valve 45, and a locking valve 108. The hydraulic fluid pump 32 is connected to be continuously driven by the engine of the motor vehicle.

The control valve 44 which may also be designated an unloading valve, is fixedly carried in the vehicle in cooperation with the tie rod 17 of the forward wheels 14. The unloading valve 44 is a three position valve, and the valve spool thereof is connected to spring-biasing means 70 which in turn is connected by linkage means 71 to the tie rod 17. Valve 44 is provided with two ports 72 and 73. The valve 44 may be of any suitable type known in the art which will operate as hereinafter described. The spring-biasing means 70 biases the valve 44 to the center position such as shown in the drawing when the wheels 14 are in the straight-ahead driving position. In this operated position of the valve 44, ports 72 and 73 are blocked by the valve. When the wheels 14 are turned to either side of the straight-ahead position, the linkage means 71 acting through the spring-biasing means 70 will operate the valve 44 to one of the other positions. In each of the other positions of the valve 44, ports 72 and 73 are interconnected through the valve.

The rear wheel centering valve 45 is a three position valve and the spool thereof is connected by spring-biasing means 75 and linkage means 76 to the tie rod 25 of the rear wheels 20. The valve 45 may be of any suitable type known in the art, operating as hereinafter described. The spring-biasing means 75 biases the valve 45 to the center position shown in the drawings when the rear wheels 20 are aligned in the straight-ahead driving position. When the valve 45 is in the center position, ports 77, 78, 79, and 80 are all interconnected through the valve. When the rear wheels are turned toward the right, linkage means 76 acting through spring-biasing means 75 will move the spool of the valve 45 to a position wherein ports 77 and 80 are interconnected, and ports 78 and 79 are interconnected, through the valve. When the wheels 20 are turned toward the left, the valve 45 is operated to the third position wherein ports 77 and 79 are interconnected, and ports 78 and 80 are interconnected, through the valve.

The embodiment of the invention shown in FIGURE 2 includes all of the various elements above described except that the valves 44 and 45 are modified in certain respects to provide the feature of automatic return of the wheels to the straight-ahead position when steering effort has been stopped and wheel is released.

Various hydraulic fluid conduits interconnect the above described elements in a particular manner to accomplish the objects of the invention.

The pressure side of the pump 32 is connected by a conduit 98 to port 79 of valve 45, and by conduit 99 to port 73 of the unloading valve 44. The suction side of the pump 32 is connected by conduit 100 to a reservoir 38.

Port 72 of the unloading valve 44, is connected by conduit 105 to the reservoir 38.

Port 80 of the rear wheel centering valve 45 is connected by conduit 106 to the reservoir 38. Port 77 of the valve 45 is connected by an obvious conduit to port 107 of the locking valve 108. The locking valve 108 is provided for separating the steering system for the rear wheels from the centering system therefor when the rear wheels are being steered, and comprises in addition to port 107, three other ports, 109, 110, and 111. The locking valve 108 may be of any suitable type known in the art which will operate as hereinafter described. The valve 108 includes two one-way check valves, one being connected to port 107, and the other being connected to port 109. When hydraulic fluid under pressure is applied to port 107, the fluid may freely flow through the locking valve 108 to port 110, and when hydraulic fluid under pressure is applied to port 109, the hydraulic fluid may freely flow through the locking valve 108 to port 111. When no hydraulic pressure is applied to either port 107 or 109, the check valves in the locking valve 108 will prevent any hydraulic fluid from flowing from ports 110 or 111 through the valve to ports 107 and 109. However, when hydraulic fluid under pressure is applied to either port 107 or 109, the check valves are so arranged that hydraulic fluid may return through the valve from either port 110 or 111. Port 110 of locking valve 108 is connected by a conduit 112 into conduit 88, and port 111 is connected by conduit 113 into conduit 89.

To describe the rear wheel centering system, it may be assumed that the forward wheels 14 are in the straight-ahead position, such as shown in FIGURE 1, and that the rear wheels 20 are turned to the right. With the wheels 20 turned to the right, the valve 45 will be operated through the spring-biasing means 75 and the linkage means 76 to a position wherein ports 77 and 80 thereof are interconnected, while the ports 78 and 79 thereof are interconnected. With the forward wheels in the straight-ahead position, the dumping valve 44 is positioned to block conduit 99. Thus the hydraulic fluid delivered by pump 32 will be applied through conduit 98 to port 79 of valve 45, and through valve 45 and port 78 thereof to port 109 of valve 108, and from valve 108 and port 111 thereof through conduit 113, conduit 89, and conduit 85 to the cylinders 21. The hydraulic fluid pressure applied to the cylinders 21 through conduit 85 will cause wheels 20 to be turned to the left toward the straight-ahead driving position. As the wheels 20 are turned toward the straight-ahead position, hydraulic fluid from the cylinders 21 will flow through conduit 84, conduit 88, conduit 112, port 110 of valve 108, valve 108 and port 107, port 77 and port 80 of valve 45, and conduit 106 to the reservoir 38. When the wheels 20 reach the straight-ahead position, the arm 24 will, through the linkage means 76 and spring-biasing means 77, move the valve 45 to the center position wherein the hydraulic fluid flowing from pump 32 through conduit 98 and port 79 is returned by the valve 45 through port 80 and conduit 106 to the reservoir 38. Since the valve 45 is operated when the rear wheels 20 are turned, the dumping valve 44 is provided to prevent the development of any hydraulic fluid pressure by pump 32 during the turning movements. Whenever the forward wheels are turned from the straight-ahead position, the dumping valve 44, will be operated to interconnect ports 72 and 73 of valve 44. The interconnection of ports 72 and 73 of valve 44 completes an obvious circuit including conduit 105 for dumping the fluid from pump 32 into the reservoir 38 thereby preventing the development of any hydraulic pressure by pump 32 which might be applied through valve 45 to the cylinder 21. With no hydraulic fluid pressures being applied through valve 45 to the lock valve 108, the check valve arrangement thereof will prevent any fluid from flowing from conduits 112 and 113 into and through the valve 108.

In the embodiment of FIGURE 2, those elements which are substantially the same as those of FIGURE 1 are designated with the same numerals. Valve 45 of FIGURE 1 is designated as valve 115 in FIGURE 2 because the valve has been changed to the extent that in the center position, ports 77 and 78 are blocked by the valve, while ports 79 and 180 are interconnected. Conduit 106 of FIGURE 1 is designated conduit 116 in FIGURE 2 because of the insertion of an orifice 117 in conduit 116 which provides for a slight amount of back pressure at port 80 of valve 115.

The dumping valve 44 of FIGURE 1 is replaced by a dumping valve 118 which is provided with three ports 119, 120 and 121. The valve spool of valve 118 is connected to the spring-biasing means 70 which biases the valve to the center position. The spring-biasing means 70 is in turn connected ot the linkage means 71, which in turn is connected to the tie rod 17 of the front wheel assembly. The valve 118 may be of any suitable type known in the art which will operate in the manner described hereinafter. The valve 118 is arranged so that in the center position, ports 119, 120 and 121 are blocked by the valve 118. When the wheels 114 of the vehicle are turned to the right, the tie rod 17 is moved to the left to operate the valve 118 to a poistion wherein ports 119 and 121 are interconnected and port 120 is blocked. When the wheels 14 of the vehicle are turned to the left, the tie rod 17 is moved to the right to operate the valve 118 to a position wherein port 119 is blocked and ports 120 and 121 are interconnected.

Two spring-biased check valves 122 and 123 are also provided. Each of the check valves 122 and 123 is constructed to substantially freely pass hydraulic fluid in one direction therethrough with the creation of a small amount of back pressure which reacts with the basic system 30.

Conduit 99 from the pump 32 is connected to port 121 of valve 118. Check valve 122 is connected to port 119, and check valve 123 is connected to port 120. The other sides of the check valves 122 and 123 are connected by a conduit 124 into the reservoir 38. The check valves 122 and 123 are so positioned that each will pass hydraulic fluid to the reservoir 38 with the creation of some back pressure at ports 119 and 120.

A conduit 126 is connected at one end thereof between check valve 122 and port 119 so that any back pressure at port 119 is applied to conduit 126. The other end of conduit 126 is connected into the valve operating means of the system 30 which when receiving a developed steering control fluid pressure operates the valve means to produce a steering of the forward wheels 14 to the left. Conduit 126 is provided with a check valve 127 therein which prevents fluid from flowing from the hydraulic steering system 30 into and through conduit 126 but permits free fluid flow in the opposite direction.

A conduit 128 is connected at one end thereof between check valve 123 and port 120 of valve 118 so that any back pressure at port 120 is applied to conduit 128. Conduit 128 at the other end thereof is connected into the valve operating means for the steering valve of the hydraulic steering system 30 which when receiving steering control fluid pressure operates the steering valve to cause a steering of the forward wheels 14 to the right. Conduit 128 is provided with a check valve 129 which will prevent hydraulic fluid from flowing from the hydraulic steering system 30 into and through conduit 128 but will permit free fluid flow in the opposite direction.

With port 121 blocked when the wheels 14 are in the straight-ahead position, hydraulic fluid pressure may be developed by pump 32 in conduit 98 to center the rear wheels 20 as previously described.

In describing the operation of the feature providing automatic return of the wheels 14 and 20 to the straight-ahead position, it may first be assumed that the hydraulic steering system 30 has been operated to develop steering control fluid pressures which have operated the hydraulic steering valve means thereof to cause the wheels 14 to be turned to the right. When steering effort has ceased, the steering control fluid pressures are removed and the hydraulic steering valve means of the hydraulic steering system 30 will restore with the wheels 14 remaining turned to the right. Since the wheels 14 are turned to the right, the valve 118 will be positioned so that port 119 is interconnected with port 121 and port 120 is blocked. Hydraulic fluid may then flow from pump 32 through conduit 98, conduit 99, port 121 of valve 118, valve 118 and port 119 thereof, check valve 122, and conduit 124 to the reservoir 38. Due to the orifice 117 and the check valve 122, hydraulic back pressure will be developed at port 119 which will be applied through check valve 127 and conduit 126 to the hydraulic steering system 30. The hydraulic fluid pressure in conduit 126 will, as previously described, be applied as a steering control fluid pressure to the valve operating means for the steering valve means of the hydraulic steering system 30 to cause the steering valve means to operate and direct hydraulic fluid through conduit 87 while venting conduit 87 to turn the forward wheels 14 to the left or from the right-hand-turned position toward the straight-ahead position. When the wheels 14 reach the straight-ahead position, valve 118 will be operated by the tie rod 17 to the center position, and flow from pump 32 through conduit 99 will be blocked at port 121 of valve 118. No hydraulic fluid pressure will then be applied through conduit 126 to the hydraulic steering system 30 and the steering valve means thereof will restore with the forward wheels 14 remaining in the straight-ahead position. Thus it may be seen that as the wheels 14 are steered or turned to the right in a steering movement, and when steering effort or its equivalent in the development of steering control fluid pressures is stopped, the wheels 14 will be automatically returned to the straight-ahead position.

When the hydraulic steering system 30 is operated to turn the wheels 14 to the left, the valve 118 will be operated to the position wherein port 119 is blocked, and port 120 is interconnected with port 121. The hydraulic fluid back pressure produced at the check valve 123 will then be applied through conduit 128 to the hydraulic steering system 30. After the steering movement is stopped and the steering valve means of the hydraulic steering system 30 has been permitted to restore, the hydraulic fluid pressure in conduit 128 will cause an operation of the steering valve means of the hydraulic steering system 30 to cause an operation of the hydraulic steering system 30 to turn the wheels 14 from the left-hand steered position to the right toward the straight-ahead position. Again, when the straight-ahead position of the wheels 14 is attained, the valve 118 will be operated to the center position wherein port 121 is blocked. With no hydraulic fluid pressure then being applied through conduit 128, the hydraulic steering system 30 will restore with the wheels 14 remaining in the straight-ahead position. Thus it may be seen that after a steering movement of the wheels 14 to the left, the wheels 14 will be automatically returned to the straight-ahead position. The automatic return of the wheels 14 to the straight-ahead position from either the left or right-hand steered positions is accomplished because the hydraulic pressure applied to the steering valve means of the hydraulic steering system 30 is always the opposite of the steering control fluid pressure applied to that valve means during a steering operation.

Note should be made that in any steering arrangement wherein the rearward wheels 20 are steered by the hydraulic steering system 30 at the same time that the forward wheels 14 are steered, it is merely necessary to parallel the connections of the conduits 126 and 128 to the operating means for the steering valve means for the rearward wheels 20 to provide for automatic centering of the rearward wheels 20 contemporaneously with the automatic centering of the forward wheels 14.

Having described the invention what is considered new and desired to be protected by Letters Patent is:

1. In a hydraulic steering system for a vehicle having a hydraulically steerable rearward wheel assembly and a forward wheel assembly, first means connected to said hydraulically steerable rearward wheel assembly for centering said rearward wheel assembly in the straight-ahead position, and second means associated with the forward wheel assembly of said vehicle and being responsive to a straight-ahead position of the forward wheel assembly for conditioning said first means to center the rear wheel assembly.

2. In a motor vehicle having a hydraulic steering system and hydraulically steerable forward and rearward wheel assemblies, the improvement comprising first means connected to said forward wheel assembly and said hydraulic steering system and being responsive to a position of said forward wheel assembly other than the straight-ahead position for operating said hydraulic steering system to turn said forward and rearward wheels to the straight-ahead position, and second means connected to said first means and said rearward wheel assembly and being responsive to a straight-ahead position of said forward wheel assembly, and a position of said rearward wheel assembly other than the straight-ahead position for turning said rearward wheel assembly to the straight-ahead position.

3. In a motor vehicle, a steerable forward wheel assembly, a hydraulically steerable rearward wheel assembly, rear wheel centering means connected with said hydraulically steerable rearward wheel assembly and said forward wheel assembly and being responsive to a straight-ahead position of said forward wheels and to a position of said rearward wheel assembly other than a straight-ahead position for operating said hydraulically steerable rearward wheel assembly for turning said rearward wheel assembly to the straight-ahead position.

4. In a motor vehicle, hydraulically steerable forward and rearward wheel assemblies, hydraulic steering system means for operating said wheel assemblies, front wheel centering means connected to said forward wheel assembly and being responsive to a position of the straight-ahead position for pressurizing said hydraulic steering system means for turning said hydraulically steerable forward wheel assembly to the straight-ahead position, and rear wheel centering means connected to said rearward wheel assembly and being responsive to a steered position of said rearward wheel assembly other than the straight-ahead position for pressurizing said hydraulically steerable rearward wheel assembly for steering said rearward wheel assembly to the straight-ahead position and means for depressurizing said hydraulic steering system means to prevent said rearward wheel assembly from turning to the straight-ahead position unless said forward wheel assembly is in the straight-ahead position.

5. In a motor vehicel having steerable forward and rearward wheel assemblies, hydraulic cylinder means connected to said rearward wheel assembly for steering said rearward wheel assembly, rearward wheel centering means including a continuously driven hydraulic fluid pump and being responsive to hydraulic fluid under pressure received from said pump and to a steered position of said rearward wheel assembly other than the straight ahead position for operating said hydraulic cylinder means to align said rearward wheel assembly in the straight-ahead position, and vent means connected to said forward wheel assembly and the pressure side of said pump for venting said pump when said forward wheel assembly is in any steered position other than the straight-ahead position.

6. In a motor vehicle having a hydraulic steering system, hydraulically steerable forward and rearward wheel assemblies, a continuously driven hydraulic fluid pump, first valve means connected to said forward wheel assembly and being responsive to a position of said forward wheel assembly other than the straight-ahead position, said first valve means directing hydraulic fluid from said pump to said hydraulic steering system to operate said hydraulic steering system for turning said forward wheel assembly to the straight-ahead position, and second valve means responsive to a position of said rearward wheel assembly other than the straight-ahead position, said second valve means directing hydraulic fluid from said pump to said rearward wheel assembly for turning said rearward wheel assembly to the straight-ahead position.

7. In a motor vehicle defined in claim 6, wherein said first valve means includes means for venting said pump to prevent the application of any hydraulic fluid under pressure to said second valve means when said forward wheel assembly is in any steered position other than the straight-ahead position.

8. In a motor vehicle as defined in claim 6, and lock valve means for blocking any hydraulic fluid flow from said rearward wheel assembly to said second valve means when said hydraulic steering system is operated to steer said rearward wheel assembly.

9. In a motor vehicle as defined in claim 6, wherein said second valve means includes means for venting said pump when said rearward wheels are aligned in the straight-ahead position.

10. In a motor vehicle having steerable forward and reaward wheel assemblies, hydraulic cylinder means connected to said rearward wheel assembly for steering said rearward wheel assembly, a rearward wheel centering valve connected to said hydraulic cylinder means, a continuously driven hydraulic fluid pump connected to said rearward wheel centering valve, said rearward wheel centering valve operating responsive to a position of said rearward wheel assembly other than the straight-ahead position for applying hydraulic fluid under pressure from said pump to said hydraulic cylinder means to align said rearward wheel assembly in the straight-ahead position, and means connected to said forward wheel assembly and said pump for preventing the application of any hydraulic fluid under pressure to said rearward wheel centering valve when said forward wheel assembly is in any position other than the straight-ahead position.

11. In a motor vehicle as defined in claim 10, wherein said means connected to said forward wheel assembly and said pump comprises a valve operating responsive to any steered position of said forward wheel assembly other than the straight-ahead position for venting the pressure side of said pump.

12. In a motor vehicle as defined in claim 10, and lock valve means for blocking any hydraulic fluid flow from said hydraulic cylinder means to said rearward wheel centering valve when said hydraulic cylinder means is operated to steer said rearward wheel assembly by any means other than said pump.

13. In a motor vehicle as defined in claim 10, wherein said rearward wheel centering valve includes venting means for stopping any further flow of hydraulic fluid under pressure to said hydraulic cylinder means when said rearward wheel assembly attains the straight-ahead position.

14. In a motor vehicle as defined in claim 13, wherein said venting means includes valve means for venting any hydraulic fluid under pressure from said pump when said rearward wheels are in the straight-ahead position.

15. In a motor vehicle having hydraulically steerable forward and rearward wheel assemblies and a hydraulic steering system for steering said forward and rearward wheel assemblies responsive to steering effort, control means for supplying hydraulic fluid under pressure to said hydraulic steering system for turning said forward and rearward wheel assemblies to the straight-ahead position when a steering effort has ceased, said control means including, a hydraulic fluid pump and forward wheel valve means responsive to a position of said forward wheel assembly other than the straight-ahead position for directing hydraulic fluid under pressure from said pump to said hydraulic steering system for turning said forward and rearward wheels to the straight-ahead position.

16. In a motor vehicle as defined in claim 15, rear wheel valve means connected with said hydraulic pump and said forward wheel valve means and being responsive to the straight-ahead position of said forward wheels and a position of said rearward wheels other than the straight-ahead position for operating said hydraulically steerable rearward wheel assembly for turning said rearward wheels to the straight-ahead position.

References Cited by the Examiner

UNITED STATES PATENTS

| | | | |
|---|---|---|---|
| 2,274,821 | 3/1942 | Bloxsom | 280—91 |
| 2,512,979 | 6/1950 | Strother | 180—79.2 |
| 2,783,849 | 3/1957 | Armington | 180—79.2 |

BENJAMIN HERSH, *Primary Examiner.*

LEO FRIAGLIA, A. HARRY LEVY, *Examiners.*